Stoves, Cooking,
Combined cooking & heating stove,
6 Air heating.
J. W. & E. Kirk.
Cooking Stove.
7,735 *
Patented Aug. 30, 1833.
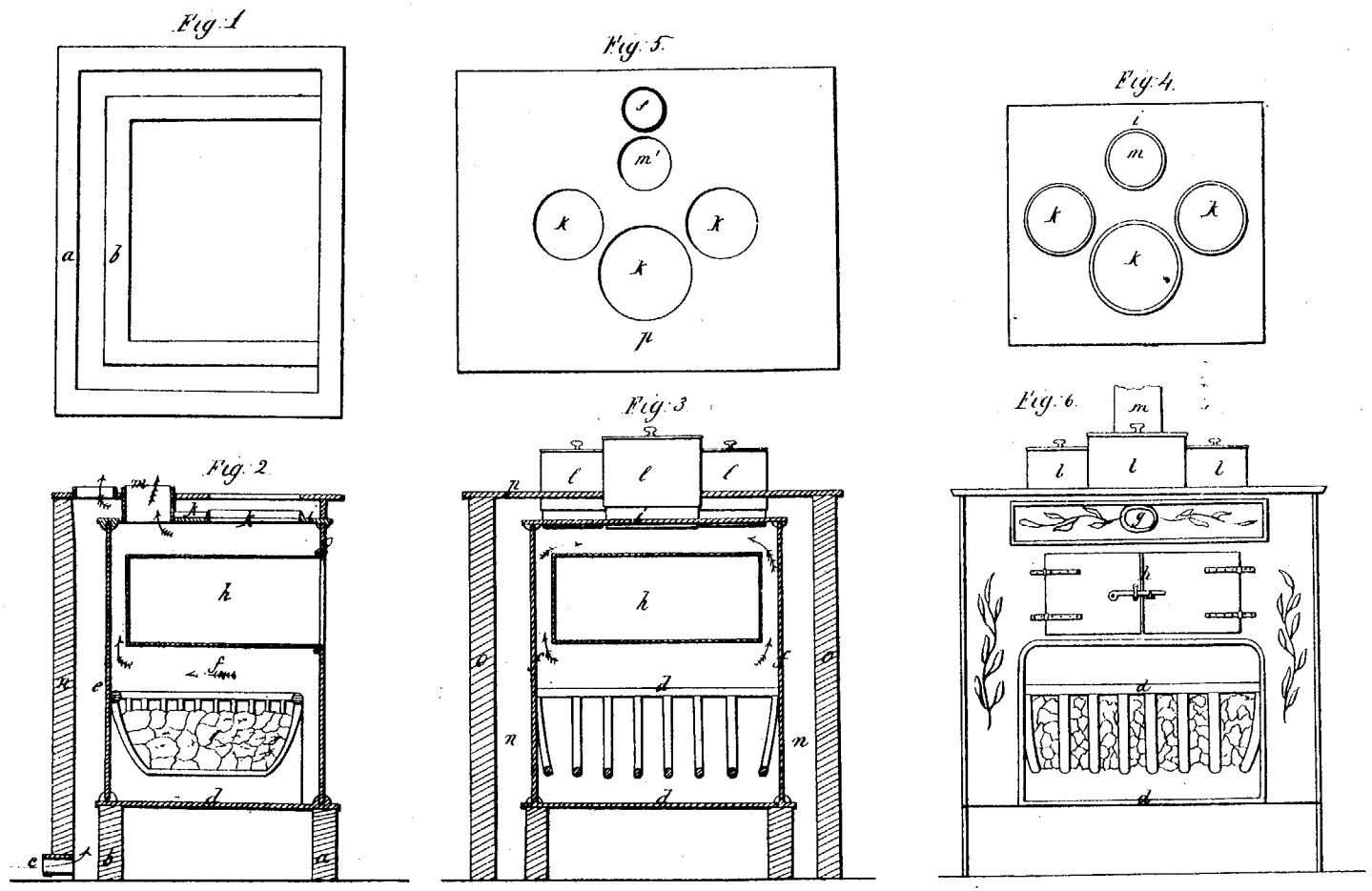
N. PETERS, PHOTO-LITHOGRAPHER, WASHINGTON, D. C.

8/30/1833 T135x

Aug. 30 1833

[illegible]

Josiah W. Kirk & Eli Kirk. Citizens.

Letters Patent.

The Schedule referred to in these Letters Patent and making part of the same, containing a description in the words of the said Josiah W. Kirk & Eli Kirk themselves of their improvement in the mode of heating air for diffusion through houses, by a structure or machine called "A fuel saving house heater & cooking stove."

To all to whom these presents shall come. We Josiah W. Kirk & Eli Kirk, native citizens of the United States & residents of the City of Philadelphia in the State of Pennsylvania, send greeting. Be it known that we the said Josiah W. Kirk & Eli Kirk have jointly invented constructed made & applied to use a new & useful improvement in the mode of heating air for diffusion through houses by a structure or machine called "A fuel saving house heater and cooking stove." of which the following is a description. The object of this improvement is to heat air for diffusion thro' the house by the agency of the same fire which is employed in cooking & yet keeping the air thus heated entirely separate from and unaffected by the smoke vapor or other effects incident to the cooking and this object is attained by a structure or machine of the following kind the proportions length, width, & height, of whose parts may of course be varied according to the size or shape required. Build for the foundation, an oblong hollow square of brick or stone wall, say about three inches thick, within this square along three of its sides, and about three inches from them, build three sides of another oblong square of brick or stone wall, one extremity of each of the short sides of which must be attached to the fourth or front side of the outer wall, into the rear or back side of the outer wall, [illegible] [illegible] or tubes, or make one or more openings for the admission of the air, lay the [illegible] iron or stone plate to which a grate is attached [illegible] [illegible] [illegible] in front along the [illegible] [illegible]

the the three inner walls and reaching over so as to cover the surface of so
much of the front wall as lies between the extremities of the short sides
of the inner walls, the walls whose upper surfaces are thus covered by
the stove plate being all of uniform & convenient height: then put up the
back & side plates of the stove (which must be plain plates) resting them
respectively on the bottom plate, & upon the back & side walls of the inner
walls. the front plate of the stove (to be ornamented as thought proper)
must correspond in size with the back plate, except that its height
must be extended as far as may be found necessary to meet & join
the uppermost plate of all hereafter described, and it must have
the proper openings for the grate & for an oven immediately over the
grate: the oven must be constructed to touch the front plate only & be
fastened in its position by one or more screw bolts, so as to admit
the fire & heat to pass all round it: the top plate of the stove must corres-
pond in size with the bottom plate, & must have properly shaped & sized
holes to admit the bottom or bottoms of one or more boilers & a pipe hole
over the centre of the oven: around each of the holes in the top plate of
the stove, let there be ledges or shoulders to extend three or more inches
upwards: now build up the back and side walls of the outer oblong
square and so much of the front as may be necessary until they reach
say three inches higher than the top plate of the stove, then let a cast
iron plate cover the entire structure, ~~and~~ resting on the tops of the walls
and of the front plate, (of course of a uniform & convenient height) this
cast iron plate having such holes or openings in it as may be necessary
to receive the ledges or shoulders above mentioned, and having another
hole or opening say one third larger than the pipe hole, in the rear of the
pipe hole & communicating as it necessarily must, with the open
space between the stove & the uppermost cast iron plate & between
the outer & inner walls & the stove; thro' this last hole or opening of the
uppermost cast iron plate, the air admitted from without, by a tube or
tubes, or other openings in the back outer wall, as above described, &
heated in passing between the walls & stove, while it is kept wholly
separate from the cooking department is ready to be diffused
by by pipes or other preferred means, throughout the house.
We claim as new, as our invention [illegible] the object of a Patent, the
combination of what we would term an air channel with the
cooking stove, in the manner we have described it, collecting and
[illegible] all the heat thrown out by the back sides & top of the stove
so as to make one fire place, and the same fuel answer the purpose
of both heating the air for the house & cooking, preserving the air
always free from all impurity.

In testimony that the foregoing is a true specification
of our said improvement as above described we have hereunto
set our hands this seventeenth day of August in the year of
our Lord, one thousand eight hundred & thirty three.

Witnesses
Geo. [illegible]
S. Badger

Joseph W. Kirk
Eli Kirk

[illegible]

Drawing 962 words